United States Patent

[11] 3,527,139

| [72] | Inventors | Sinclair Upton Cunningham<br>East Kilbride, Glasgow Scotland;<br>Ronald Graham McIntyre, Glasgow, Scotland |
| --- | --- | --- |
| [21] | Appl. No. | 735,400 |
| [22] | Filed | June 7, 1968 |
| [45] | Patented | Sept. 8, 1970 |
| [73] | Assignee | National Research Development Corporation<br>London, England<br>a corporation of Great Britain |
| [32] | Priority | June 12, 1967 |
| [33] |  | Great Britain |
| [31] |  | 27,057/67 |

[54] MACHINE TOOLS
13 Claims, 8 Drawing Figs.

[52] U.S. Cl. .................................................. 90/15.1,
90/14, 90/20, 90/21.5, 77/64, 29/26
[51] Int. Cl. ................................................ B23c 1/14,
B23c 9/00, B23b 39/00
[50] Field of Search .................................... 90/11,
21.5, 21, 21.2, 15.1, 56, 20; 77/64; 74/(Consulted);
82/(Consulted); 51/123, 232; 29/26, 27, 563, 564, 51

[56] References Cited
UNITED STATES PATENTS

| 2,948,168 | 8/1960 | McCormick | 77/31 |
| --- | --- | --- | --- |
| 2,957,362 | 10/1960 | Kelm | 90/20-X |
| 3,232,141 | 2/1966 | Swanson et al. | 90/17-X |
| 3,267,772 | 8/1966 | Burg | 77/64 |
| 3,456,533 | 7/1969 | Firth et al. | 82/2 |

*Primary Examiner*—Gil Weidenfeld
*Attorney*—Larson and Taylor

ABSTRACT: A machine tool in which a workpiece is carried in a holder capable of assuming any of an infinite number of positions within a generally cylindrical region the axis of which coincides with the axis of rotation of a cylindrical member carrying the holder. The holder can move over a rectilinear path normal to the axis of the cylindrical member to co-operate with a tool held in a second angularly positionable holder, the arrangement being such that the angular position of the second holder and the angular relationship of the rectilinear path can be put in a specific relationship to each other.

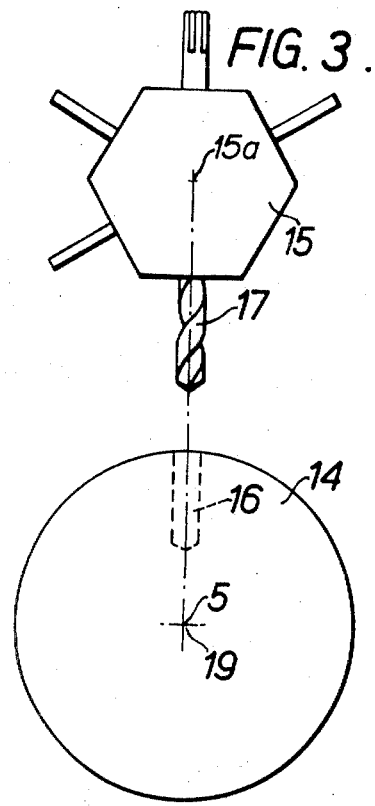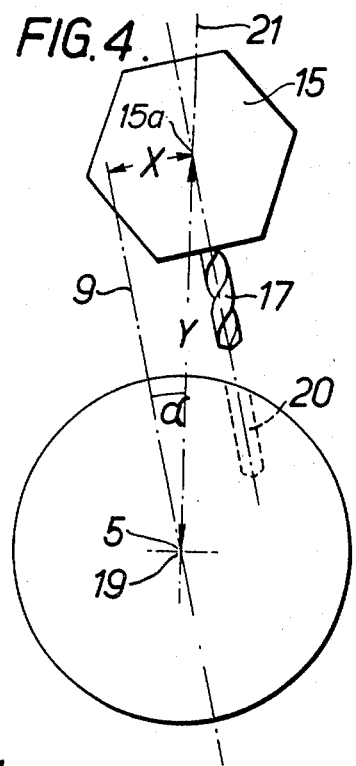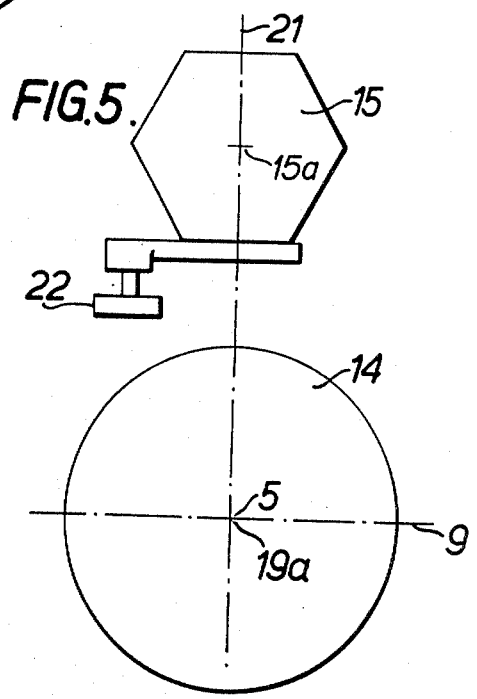

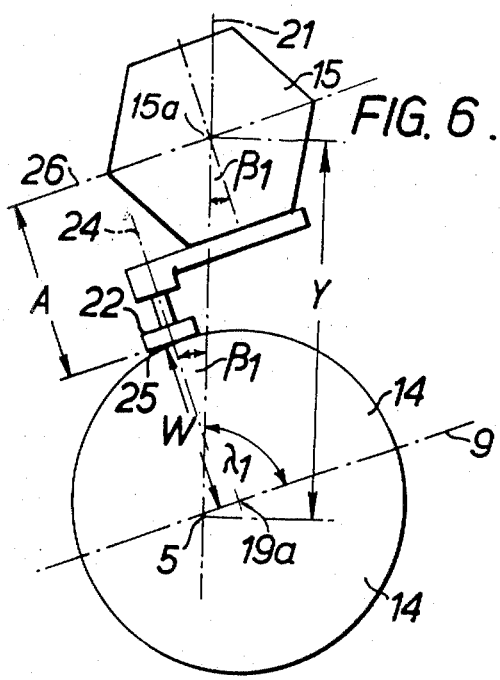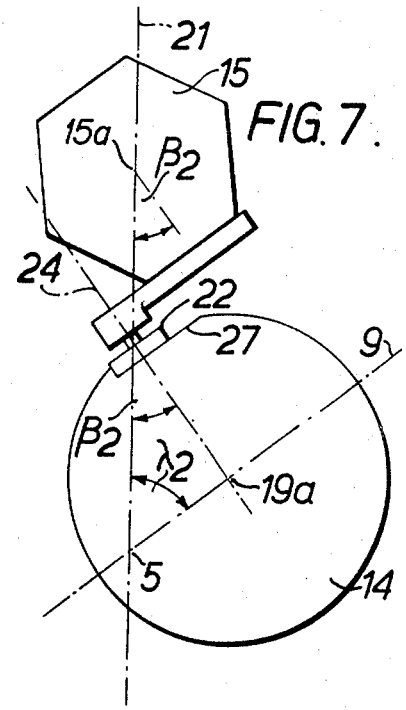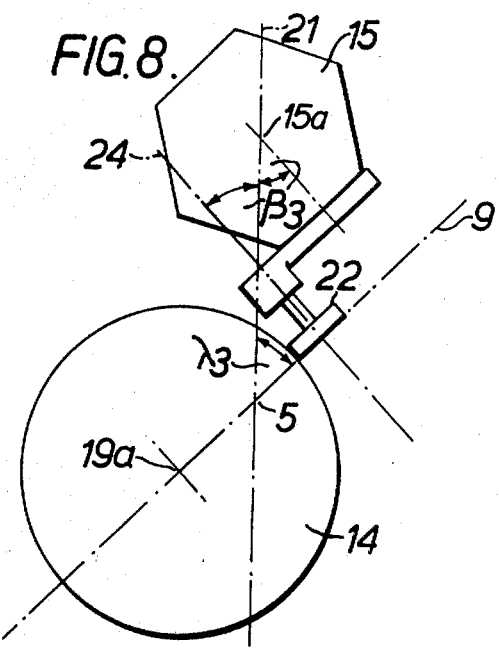

MACHINE TOOLS

The present invention relates to machine tools.

In co-pending U.S. Pat. application Ser. No. 714,504 now U.S. Pat. No. 3,374,959 there is described a machine tool including workpiece clamping means mounted on an intermediate member which itself is carried by a rotatable member rotatably mounted in a housing, the intermediate member being so mounted on the rotatable member that it is adjustable during use of the machine tool in a diametrical direction across the rotatable member, and a plurality of tool or tool holding means distributed about the workpiece clamping means at different angular positions. In such a machine tool, the diametrical direction in which the intermediate member is adjustable during use may, for example, be made parallel with the axis of a tool such as a drill whereby a bore may be formed in the workpiece by feeding the workpiece on to the tool along the diametrical direction. The control system input controls the angular orientation of the aforesaid diametrical direction and the position and velocity of the intermediate member, and hence the workpiece, along the diametrical direction.

In co-pending U.S. Pat. application Ser. No. 570,045 now U.S. Pat. No. 3,456,533 there is described a translational device comprising a housing, an outer cylindrical member mounted for rotation in the housing about a first axis of rotation, an intermediate member mounted for rotation within the outer cylindrical member about a second axis parallel to and spaced from the first axis of rotation, a holder for a workpiece or tool mounted for rotation in the intermediate member about a third axis parallel to and spaced from the second axis of rotation, first drive means for rotating the intermediate member relative to the outer member and second drive means for rotating the outer member relative to the housing. In order to achieve a rectilinear path of the holder in a plane normal to the several axes, the control system must control rotation of the outer cylindrical member and the intermediate member during operation whereby from these two rotational movements a rectilinear path of the holder results. This is a complex task.

In co-pending U.S. Pat. application Ser. No. 735,473 there is described a control arrangement for use in a translational device such as that described in U.S. Pat. application Ser. No. 570,045 which in effect removes from the external control system the promotion of the rectilinear path, whereby the onus on the external control system is only to select the orientation of the rectilinear path and the position and velocity of the holder along the rectilinear. However, with the arrangement described in U.S. Pat. application Ser. No. 735,473 the rectilinear path is a diameter of the outer cylindrical member and cannot be a chord of the cylindrical member and hence with each tool only having a single operating position it is only possible for each tool to perform a single operation predetermined in its position on the workpiece unless there is movement of the workpiece relative to the rectilinear path. Such a single operation might be boring along a diameter, in which case it would not be possible with the same tool also to form an offset bore, or milling on a chord of the workpiece in which case it would not be possible with the same tool also to mill on a diameter of the workpiece.

It is an object of the present invention to enable a single tool to be used for performing at least two discrete functions, such discrete functions being, for example, boring, tapping or reaming along axes of differing offsets from a datum in the workpiece or face working at differing distances from the datum in the workpiece.

According to the present invention there is provided a machine tool comprising a cylindrical member mounted for rotation within a housing, a first holder for a workpiece or a rotary tool carried by the cylindrical member so that the first holder and hence the workpiece or tool carried thereby may be caused, by virtue of movement of the first holder relative to the cylindrical member and of the cylindrical member relative to the housing, to assume any one of an infinite number of positions within a generally cylindrical region the axis of which is co-axial with the axis of rotation of the cylindrical member, the arrangement being such that the first holder may be caused to move over a rectilinear path normal to and intersecting the axis of rotation of the cylindrical member, a second holder for the tool or workpiece, whichever is not held in the first holder, mounted for rotational movement about an axis parallel to the axis of rotation of the cylindrical member, means for angularly positioning the second holder about its axis of rotational movement, and means for selecting the angular relationship of the said rectilinear path relative to the housing, the angular position of the second holder and the angular relationship of the rectilinear path being in a specific relationship to one another. In the case where the first holder carries the workpiece and the second holder carries a rotary tool in the form of a drill, tap, reamer or the like, the said specific relationship is that the axis of rotation of the drill, tap or reamer is inclined to a datum line normal to and intersecting the axis of angular movement of the second holder and the axis of rotational movement of the cylindrical member by an angle which is the same as the angle of inclination of the rectilinear path to the datum line. A bore is formed in the workpiece by moving the workpiece along the rectilinear path towards and over the tool. In order to change from forming a bore of a first offset to forming a bore of a second offset the second holder and the cylindrical member are rotated in similar senses about their respective axes through similar angles such that the change in offset is produced.

In the case where the first holder carries a workpiece and the second holder carries a rotary tool in the form of a milling cutter or the like in which the axis of rotation of the tool is normal to the plane of the surface to be formed on the workpiece, and the said specific relationship is that the angle of inclination of the axis of rotation of the tool to the aforesaid datum line is complementary to the angle of inclination of the said rectilinear path to the said datum line.

In the case where the milling cutter is an end working tool, that is, relative motion between the cutter and the workpiece during machining occurs in a direction parallel to the axis of rotation of the tool, the said specific relationship is that the angle of inclination of the axis of rotation of the tool to the aforesaid datum line is the same as the angle of inclination of the said rectilinear path to the said datum line.

In the case where the tool is a drill, tap, reamer or the like, and is carried in the first holder, the said specific relationship is that the angle of inclination of the rectilinear path to the said datum line is the same as the angle of inclination to the datum line of the axis of the bore to be formed in the workpiece. In the case where the tool is a milling cutter or the like and is carried in the first holder, the said specific relationship is that the angle of inclination of the rectilinear path to the datum line is the same as the angle of inclination to the datum line of a line in the general direction of pass of the tool relative to the workpiece, which line is a generatrix of the surface to be formed on the workpiece.

In the case where the milling cutter carried in the first holder is an end working tool, that is, relative motion between the cutter and the workpiece occurs in a direction parallel to the axis of rotation of the tool, the said specific relationship is that the angle of inclination of the rectilinear path to the aforesaid datum line is the same as the angle of inclination to the datum line of a line perpendicular to the surface to be formed.

In those cases where the tool is a drill, tap, reamer or the like, knowing the distance X of offset of the bore from a datum in the workpiece, which datum is in a plane containing the rectilinear path and the axis of rotation of the cylindrical member in the case where the workpiece is held in the first holder, and is coincident with the axis of rotational movement of the second holder in the case where the workpiece is held in the second holder, and the distance Y between the axis of rotational movement of the second holder and the axis of rotation of the cylindrical member, the common angle $a$ of inclination of the rectilinear path and the axis of rotation of the tool is given by:

$$\alpha = \sin^{-1}\frac{X}{Y}$$

In those cases where the tool is a milling cutter or the like held in the second holder and whose axis of rotation is normal to the plane of the surface, for example a flat or chordal slot, to be formed, the angle λ of inclination of the rectilinear path to the datum line is given by:

$$\lambda = \sin^{-1}\frac{A+W}{Y}$$

where A is the perpendicular distance between the forward face of the tool and a line parallel to the forward face of the tool intersecting the axis of rotational movement of the tool holders; W is the perpendicular distance between the surface to be formed and the above defined datum in workpiece; and Y is the distance as defined above.

In those cases where the tool is a milling cutter or the like held in the first holder and its axis of rotation is normal to the rectilinear path and is in a plane normal to the axis of rotation of the cylindrical member, the angle μ of inclination of the rectilinear path to the datum line is given by:

$$\mu = \sin^{-1}\frac{W+B}{Y}$$

where W is the perpendicular distance between the axis of rotational movement of the second holder and the surface to be formed; B is the perpendicular distance between the rectilinear path and the forward face of the tool; and Y is as defined above.

An embodiment of the invention will now be described by way of example with reference to the accompanying drawings in which:

FIG. 3 is a diagrammatic end view of the turret and workpiece of the machine tool illustrated in FIGS. 1 and 2, set up for boring on a diameter of the workpiece;

FIG. 4 is similar to FIG. 3 but illustrating the machine tool set up for offset boring;

FIG. 5 is a diagrammatic end view of the machine tool illustrated in FIGS. 1 and 2, the turret carrying a milling cutter;

FIG. 6 is a view similar to FIG. 5 with the milling cutter at a tangent to the workpiece;

FIG. 7 is a view similar to FIG. 5 with the milling cutter cutting on a chord of the workpiece; and FIG. 8 is a view similar to FIG. 5 with the milling cutter prior to cutting on a diameter of the workpiece.

Figure 1:
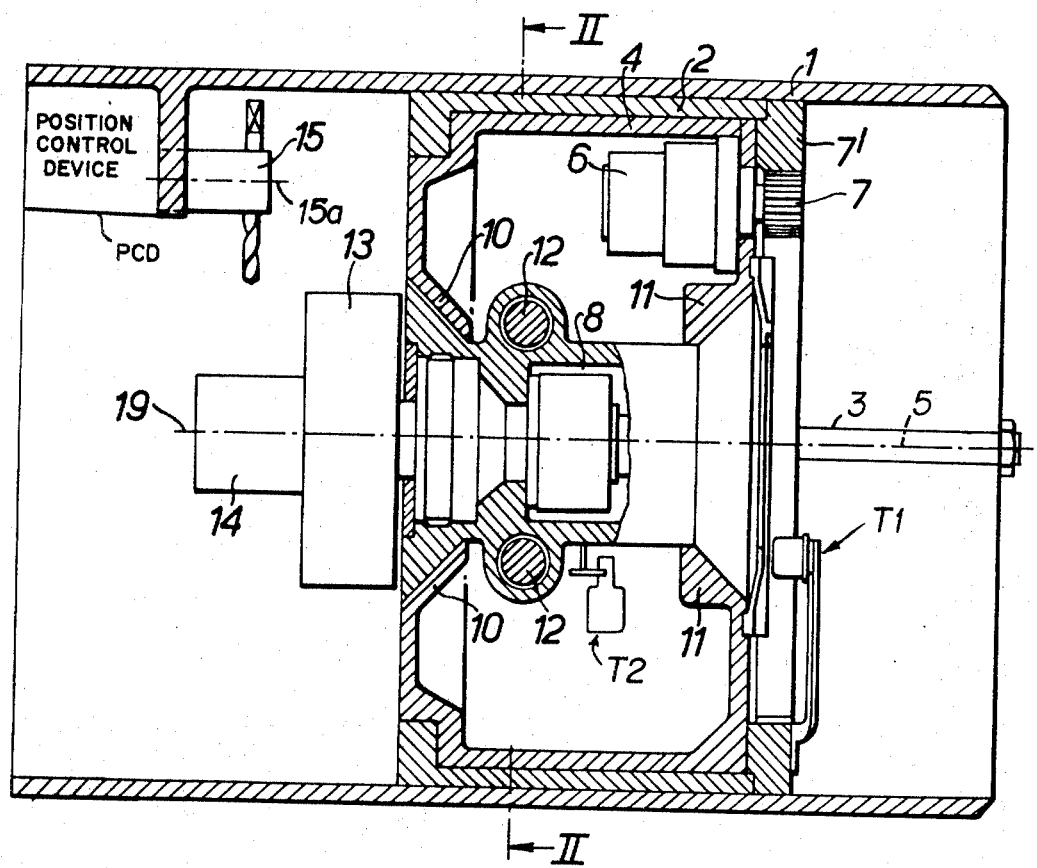
FIG. 1 is an axial sectional view of a machine tool embodying the present invention.
Figure 2:
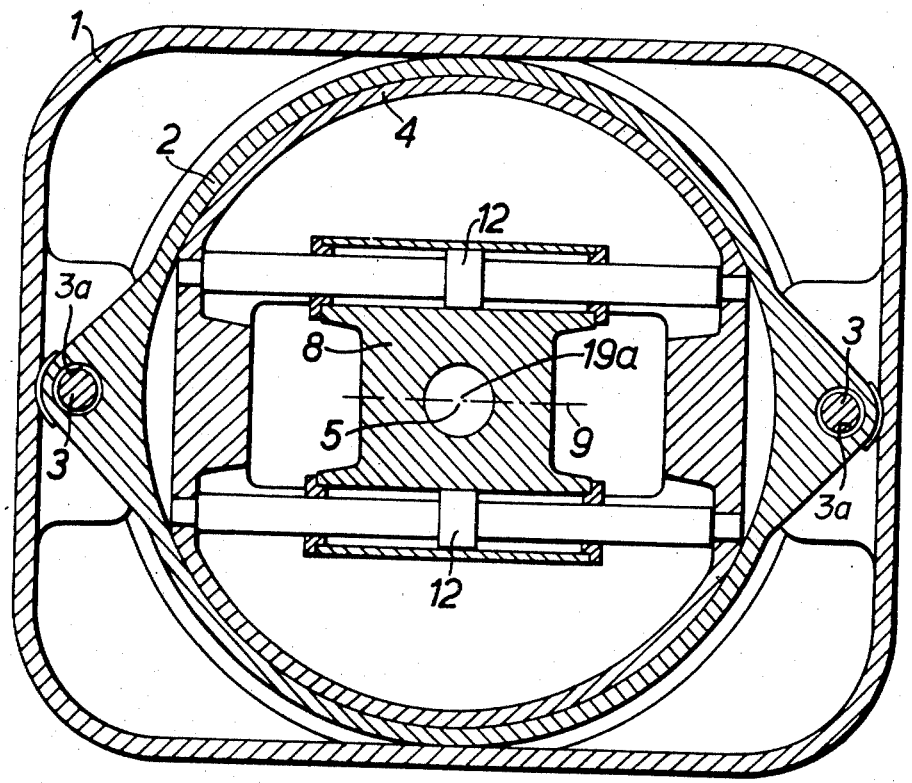
FIG. 2 is a view taken on the line II—II in FIG. 1.

The machine tool illustrated in FIGS. 1 and 2 is fully described in co-pending U.S. Pat. application Ser. No. 714,504 and it will only be described herein to the extent necessary for an understanding of the present invention.

The machine tool comprises a housing 1 within which is located an intermediate member 2 which is movable longitudinally of the housing 1 by double acting rams each of which includes a piston rod 3 connected at one end to the housing 1 and extending into a cylinder 3a in the intermediate member 2. Each piston rod has a piston co-operable with the wall of the cylinder 3a to bound, at opposite sides of the piston, chambers which may be selectively pressurized with hydraulic fluid to move the intermediate member 2 in one or the other of the axial directions relative to the housing 1 and to position the intermediate member 2 at the required axial position relative to the housing 1. Mounted for rotation, within the intermediate member 2 is a cylindrical member 4 which is rotatable about an axis 5. The cylindrical member 4 is driven in rotation by a motor 6, carried by the member 4, the shaft of which carries a gear wheel 7 which meshes with a gear track 7' carried by the intermediate member 2.

Mounted within the cylindrical member 4 is a spindle housing 8 which is constrained for movement along a diameter 9 of the cylindrical member 5 by tracks 10 and 11. Double-acting rams 12 serve to move and position the spindle housing 8 longitudinally of the diametrical rectilinear path 9. The spindle housing 8 contains a motor for rotating a holder 13 for a workpiece 14 and also for positioning the holder 13 angularly about its axis 19 of rotation.

The housing 1 carries a turret 15 which is rotatable about an axis 16 to index the required tool into its operative position. A position control device shown schematically and denoted PCD provides rotation of turret 15 about an axis 15a parallel to the axis of cylindrical member 5 as well as angular positioning of turret 15 about axis 15a. Position control device PCD can take any one of a number of conventional forms.

The workpiece 14 may be disposed at any position within a generally cylindrical region co-axial with the axis 5 by operation of the rams 3 to locate the workpiece longitudinally of the axis 5, by rotation of the cylindrical member 4 so that the diameter 9 is located in an axial plane containing the desired position of the workpiece 14, and by operation of the rams 12 to move the workpiece 14 along the diametrical rectilinear path 9 to its desired position.

The axis 5 may be referred to as the "Z" axis; the diameter 9 may be referred to as the "R" axis and the angle of inclination of the R axis to a datum line normal to the axis 5 may be referred to as θ. Thus, the position of the workpiece 14 may be defined in terms of Z, R and θ.

If it is desired to form a bore 16 (see FIG. 3) along a line in the workpiece 14, which line intersects the rotational axis 19, the required drill 17 is indexed so that its axis of rotation intersects the Z axis 5. The cylindrical member 4 is rotated until the R axis 9 intersects the axis 15a of rotation of the turret 15 and is then locked against further rotation. The spindle housing 8 is then moved longitudinally of the R axis 9 whereby the workpiece 14 approaches the drill 17.

A first transducer T1 provides an indication of the value of θ and a second transducer T2 provides an indication of the value of R, the distance of the axis 19a of rotation of the workpiece (which in FIGS. 1 and 2 is shown coincident with the Z axis 5) from the Z axis 5.

If it is desired to offset drill the workpiece 14, that is, form a bore 20 therein along a chord of the workpiece 14, that is, along a line which does not intersect the axis 19, the turret 15 and the workpiece 14 are rotated in similar senses about their axes 15a and 19 from their conditions illustrated in FIG. 3 through an angle α which is given by:

$$\alpha = \sin^{-1}\frac{X}{Y}$$

where X is the perpendicular distance of offset of the axis of the bore 20 from the Z axis 5; and Y is the distance between the Z axis 5 and the axis of rotation of the turret 15.

The workpiece is moved along the R axis 9 to feed the workpiece on to the drill 17.

A datum lime 21 normal to and intersecting the axis 15a of rotation of the turret 15 and the axis 5 of rotation of the cylindrical member 4, may be imagined and it will be realised that for the purpose of offset drilling, the angle of inclination of the axis of rotation of the drill to the datum line and the angle of inclination of the R axis 9, which is the rectilinear path of movement of the workpiece 14, to the datum line 21 are the same.

It will be realised that if a plurality of bores are formed in the workpiece 14 by the same tool 17, each of the bores having differing offsets, all of the bores are parallel. However, it is to be understood that the line in the workpiece to which the bore or bores is or are parallel is determined by the orientation of the workpiece relative to the R axis 9 about the axis 19a. Thus, bores whose axes are inclined to one another may be formed by angularly displacing the workpiece through an angle corresponding to the inclination of the bores to one another, in the appropriate sense between boring operations.

The above described procedures may also be followed if the tool 17 is not a drill but a reamer, tap or the like.

Reference is now made to FIGS. 5 to 8 wherein the turret is illustrated as provided with a milling cutter 22 of a type in which the cutters are on the cylindrical surface of the cutter. In FIGS. 5 to 8 the workpiece is illustrated in making successive passes, in FIG. 7 a flat or slot of shallow depth is formed on the workpiece and in FIG. 8, which illustrates the condition several passes later, a slot of a depth equal to the radius of the workpiece is being formed in the workpiece. Thus, the axis of rotation of the cutter is normal to the surface to be formed, which surface may be regarded as the flat in FIG. 7 or the bottom of the slot in FIG. 8. FIG. 5 illustrates the cutter 22 in an idle position, it being out of the path swept by movement of the workpiece 14 along the R axis 9.

FIG. 6 illustrates the turret 15 and workpiece 14 so oriented that the milling cutter 22 is at a tangent to the workpiece 14. In order that the cutter 22 shall be at a tangent to the workpiece 14, the turret 15 is so positioned that the axis 24 of rotation of the cutter 22 is inclined to the datum line 21 at an angle $\beta$ and the R axis 9 is inclined at an angle $\lambda$ to the datum line 21, $\beta$ and $\lambda$ are complementary. The angle $\lambda$ is determined from:

$$\lambda = \sin^{-1} \frac{A+W}{Y}$$

where A is the perpendicular distance between the forward face 25 of the cutter 22 and a line 26 parallel to the cutter face 25 intersecting the axis 15a of rotation of the turret 15; W is, in the present case since the cutter is passing at a tangent to the workpiece 14, the radius of the workpiece 14; and Y is the distance between the Z axis 5 and the axis 15a of rotation of the turret 15.

FIG. 7 illustrates the orientation of the turret, workpiece and R axis when the cutter is cutting a slot along a chord of the workpiece. In this case, the dimension W is the perpendicular distance between the bottom 27 of the slot and the axis 19 of rotation of the workpiece 14.

It will be realised that a deep slot can be formed in the workpiece 14 by successive passes of the workpiece past the cutter 22 with a variation of $\beta$ and $\lambda$ between each pass whereby the value of W is reduced after each pass.

FIG. 8 illustrates the orientation of the turret, workpiece and R axis 9 just prior to a final pass in a series of passes for forming a slot the bottom of which is on a diameter of the workpiece. The diameter with which the bottom of the slot is coincident is, of necessity, coincident with the R axis 9. In the operation illustrated in FIG. 8, W is zero and therefore:

$$\lambda = \sin^{-1} \frac{A}{Z}$$

If the positioning of either one or both of the turret 15 and R axis 9 is by digital rather than analogue means, it is desirable that the angular increments in $\alpha$, $\beta$, $\lambda$ should be such as to produce uniform linear increments $i$, X and W.

If it is desired to machine a flat the bottom of which is inclined to the bottom of a flat already formed, then the workpiece is angularly displaced relative to the R axis 9 about the axis 19 through an angle corresponding to the angle of inclination of the bottoms of the two flats, this displacement being effected between machining operations.

If it is desired to form a flat or slot which is of a width greater than the diameter of the cutter, successive traverses of the workpiece are made, the workpiece being displaced in one or more steps, so required, in the direction of the first axis 5 by means of the rams 3 between traverses.

The axis 24 of rotation of the cutter 22 is offset from the axis 15a of rotation of the turret in order to reduce the required length of freedom of movement of the workpiece in the direction of the R axis 9. It will be realised that if the axis 24 were to intersect the axis 15a then, the workpiece would have to move further along the R axis 9 in order to make a complete pass of the cutter, consider in this respect FIG. 8.

Whilst in the embodiment specifically described above, the workpiece is mounted on the translational device, it is to be understood that the tool could be mounted on the translational device. Such an arrangement might, for example, occur in a milling machine or a production line borer.

Whilst the tool is described as being mounted on a turret, it is to be understood that any form of mounting for the tool may be used which provides for the rotational movement and positioning of the tool about an axis parallel to the axis of rotation of the cylindrical member of the translational device.

The embodiments of the invention particularly described above is concerned with side working. It is to be understood that the invention is also of use in end working.

It will be realised that it would be possible to perform each of the several operations which can be performed by a single tool when the present invention is employed by a plurality of separate tools each set up appropriately for performing a respective one of the operations. Such an arrangement would increase the number of tools required and in certain cases would require that the length of the R axis would have to be increased over the length which is sufficient in an arrangement embodying the present invention.

It is to be understood that the term "complementary" is used in this specification in its geometrical sense, that is, complementary angles are angles the sum of which is a right angle.

We claim:

1. A machine tool comprising a housing, a cylindrical member disposed within said housing, means for angularly positioning said cylindrical member about the axis thereof relative to the housing, means for positioning said cylindrical member axially relative to said housing, a first holder for a workpiece, means for mounting said first holder from the cylindrical member and for moving said first holder over and positioning said first holder along a rectilinear path normal to and intersecting the axis of rotation of the cylindrical member so that the workpiece carried by the first holder may assume any one of an infinite number of positions within a generally cylindrical region the axis of which is coaxial with the axis of rotation of the cylindrical member by virtue of movement of the first holder relative to the cylindrical member and of the cylindrical member relative to the housing, a second holder for a rotary tool, means for mounting said second holder for rotational movement about an axis parallel to the axis of said cylindrical member, means for angularly positioning said second holder about the axis of rotational movement thereof, and means for angularly positioning said rectangular path relative to said housing, the angular position of said second holder and the angular position of the rectilinear path relative to the housing being in specific relation to one another.

2. A machine tool according to claim 1 in which the axis of rotation of the rotary tool is inclined to a datum line normal to and intersecting the axis of angular movement of the second holder and the axis of rotational movement of the cylindrical member by an angle which is the same as the angle of inclination of the rectilinear path to the datum line.

3. A machine according to claim 1 in which the axis of rotation of the tool is normal to the plane of the surface to be formed on the workpiece, and the said specific relationship is that the angle of inclination of the axis of rotation of the tool to the aforesaid datum line is complementary to the angle of inclination of the said rectilinear path to the said datum line.

4. A machine according to claim 1 and in which the tool comprises a milling cutter used as an end working tool and the said specific relationship is that the angle of inclination of the axis of rotation of the tool to the aforesaid datum line is the same as the angle of inclination of the said rectilinear path to the said datum line.

5. A machine tool comprising a housing, a cylindrical member disposed within said housing, means for angularly positioning said cylindrical member about the axis thereof relative to the housing, means for positioning said cylindrical member axially relative to said housing, a first holder for a rotary tool, means for mounting said first holder from the cylindrical member and for moving said first holder over and positioning said first holder along a rectilinear path normal to and intersecting the axis of rotation of the cylindrical member so that the tool carried by the first holder may assume any one of an infinite number of positions within a generally cylindrical region the axis of which is coaxial with the axis of rotation of the cylindrical member by virtue of movement of the first holder relative to the cylindrical member and of the cylindrical member relative to the housing, a second holder for a workpiece, means for mounting said second holder for rotational movement about an axis parallel to the axis of said cylindrical member, means for angularly positioning said second holder about the axis of rotational movement thereof, and means for angularly positioning said rectangular path relative to said housing, the angular position of said second holder and the angular position of the rectilinear path relative to the housing being in specific relation to one another.

6. A machine according to claim 5 in which the tool is a rotary boring tool, the said specific relationship being that the angle of inclination of the rectilinear path to the said datum line is the same as the angle of inclination to the datum line of the axis of the bore to be formed in the workpiece.

7. A machine according to claim 5 in which the tool is a milling cutter, the said specific relationship being that the angle of inclination of the rectilinear path to the datum line is the same as the angle of inclination to the datum line of a line in the general direction of pass of the tool relative to the workpiece, which line is a generatrix of the surface to be formed on the workpiece.

8. A tool according to claim 5 in which the tool is a milling cutter and is used as an end working tool, the said specific relationship being that the angle of inclination of the rectilinear path to the aforesaid datum line is the same as the angle of inclination to the datum line of a line perpendicular to the surface to be formed.

9. A machining method including the steps of mounting a workpiece in a first holder carried by a cylindrical member for movement along a rectilinear path normal to and intersecting the axis of the cylindrical member, said cylindrical member being mounted for rotation within a housing, said first holder being movable relative to said cylindrical member and said cylindrical member being movable relative to said housing such that said first holder may assume any one of an infinite number of positions within a generally cylindrical region the axis of which is coaxial with the axis of rotation of the cylindrical member, mounting a rotary tool in a second holder which is mounted for rotational movement about an axis parallel to the axis of the cylindrical member, and positioning said rotary tool holder so that the axis of rotation of the tool is inclined to a datum line normal to and intersecting the axis of rotational movement of the cylindrical member by an angle which is the same as or complementary to the angle of inclination of said rectilinear path to said datum line.

10. A method as claimed in claim 9 wherein said tool is a drill tap or reamer, and the axis of rotation of the tool is inclined to said datum line by an angle which is the same as the angle of inclination of said rectilinear path to said datum line including moving said workpiece along said rectilinear path towards and over said tool.

11. A method as claimed in claim 9, including, in order to change from forming a bore of a first offset to forming a bore of a second offset, rotating said second holder and said cylindrical member in similar senses about their respective axes through similar angles such that the change in offset is produced.

12. A method as claimed in claim 9, wherein said tool is a rotary cutting tool in which the axis of rotation of the tool is normal to the plane of the surface to be formed on the workpiece, said method including positioning said rotary tool holder so that the axis of rotation of the tool is inclined to said datum line at an angle which is complementrary to the angle of inclination of said rectilinear path to said datum line.

13. A method as claimed in claim 9, wherein said tool is a milling cutter used as an end working tool, said method including positioning said rotary tool holder so that the axis of rotation of the tool is inclined to the said datum line at an angle which is the same as the angle of inclination of said rectilinear path to said datum line.

UNITED STATES PATENT OFFICE
CERTIFICATE OF CORRECTION

Patent No. 3,527,139         Dated September 8, 1970

Inventor(s) Sinclair Upton Cunningham and Ronald Graham McIntyre

It is certified that error appears in the above-identified patent and that said Letters Patent are hereby corrected as shown below:

Column 1, line 14, delete:
        27,057/67

Column 1, line 14, in place of above deleted part, insert:
        27,025/67

SIGNED AND
SEALED
MAR 2 1971

(SEAL)
Attest:

Edward M. Fletcher, Jr.
Attesting Officer

WILLIAM E. SCHUYLER, JR.
Commissioner of Patents